United States Patent [19]

Taki et al.

[11] Patent Number: 5,199,024
[45] Date of Patent: * Mar. 30, 1993

[54] OPTICAL DATA STORAGE MEDIUM HAVING EMBEDDED TRACKING INFORMATION

[75] Inventors: Kazunari Taki, Nagoya; Hideo Maruyama, Kuwana; Riki Matsuda, Nagoya; Yumiko Ohashi, Hashima, all of Japan

[73] Assignee: Brother Kogyo Kabushiki Kaisha, Nagoya, Japan

[ * ] Notice: The portion of the term of this patent subsequent to Feb. 18, 2009 has been disclaimed.

[21] Appl. No.: 562,254

[22] Filed: Aug. 3, 1990

[30] Foreign Application Priority Data

Aug. 18, 1989 [JP] Japan ................................. 1-213276

[51] Int. Cl.⁵ ................................................ G11B 7/24
[52] U.S. Cl. .............................. 369/275.5; 369/275.1; 428/694; 428/900
[58] Field of Search ................ 369/275.4, 275.3, 275.1, 369/283, 284, 286, 288; 346/76 L, 135.1

[56] References Cited

U.S. PATENT DOCUMENTS

| | | |
|---|---|---|
| 4,288,510 | 9/1981 | Tinet et al. ........................ 346/135.1 |
| 4,481,620 | 11/1984 | Murakami ........................ 369/275.4 |
| 4,578,788 | 3/1986 | Ahn et al. ........................ 369/275.4 |
| 4,825,430 | 4/1989 | Halter et al. ........................ 369/284 |
| 4,839,076 | 6/1989 | Yoshitomi et al. ................... 369/284 |
| 4,965,153 | 10/1990 | Imataki et al. ........................ 369/284 |
| 4,972,402 | 11/1990 | Miura et al. ........................ 369/275.1 |
| 5,077,725 | 12/1991 | Nakayama et al. ............... 369/275.3 |
| 5,089,358 | 2/1992 | Taki et al. ............................ 369/283 |

FOREIGN PATENT DOCUMENTS

| | | |
|---|---|---|
| 58-88844 | 5/1983 | Japan ................................. 369/275.4 |
| 2084786 | 4/1982 | United Kingdom ............. 369/275.3 |

Primary Examiner—Donald McElheny, Jr.
Attorney, Agent, or Firm—Oliff & Berridge

[57] ABSTRACT

An optical data storage medium having a continuous tracking guide strip defining a single spiral recording track, or concentric tracking guide rings defining concentric recording tracks. The tracking guide strip or rings provide(s) tracking servo information which is optically read to position an optical head relative to the data storage medium, for centering a read/write beam on a desired recording track. The tracking guide strip or rings is/are formed of a material which has a higher light absorption coefficient than that of a material of the recording track(s). A method for fabricating the storage medium, and a tracking system for the storage medium are also disclosed.

12 Claims, 4 Drawing Sheets

LASER RADIATION

OPTICAL DATA STORAGE MEDIUM HAVING EMBEDDED TRACKING INFORMATION

BACKGROUND OF THE INVENTION

1. Field of the Invention

The present invention relates to an optical data storage medium such as an optical disk on or from which information is optically written or read, by a laser beam, for example.

2. Discussion of the Prior Art

An example of a known optical data storage medium is shown generally at 60 in FIG. 7, which has a substrate 61 of an acrylic or polycarbonate resin, glass or the like, and a data storage layer 62 and a protective layer 63 which are formed on the substrate 61. The storage layer 62 may be a thin magnetic layer consisting of a metal or compound such as Te or TeOx, or GdTbFe, TbFeCo or other suitable magnetic material.

Information is written on the storage layer 62 by irradiating local spots of the layer 62 with a laser beam, and thereby heating the local spots, so that pits are formed selectively at the local spots, or the light reflectance or direction of magnetization at the local spots is changed or reversed. The information thus written on the storage layer 62 may be optically read, based on a variation in the amount of a read beam reflected from the storage layer 62, or by utilizing the magneto-optical effect, for example.

Usually, the substrate 61 has a spiral tracking groove or concentric tracking grooves, so that each recording track is defined by adjacent portions of the spiral groove or the adjacent concentric grooves. For accurate alignment of a read/write beam with the center of width of each recording track, the tracking groove or grooves is/are followed by a single tracking laser beam, such that the beam reflected by the medium 60 is detected by a push-pull or split photodetector. More specifically, if the tracking laser beam is centered on a certain recording track or between the adjacent two concentric tracking grooves, the two first-order diffraction beams are symmetrical with respect to the centerline of the recording track, and the differential signal produced by the split photodetector is zero. However, if the tracking beam is not centered on the recording track, the two first-order diffraction beams are no longer identical and interfere differently in the region of overlap with the zeroth-order diffraction beam, and the diffraction pattern is not symmetrical, whereby the differential signal from the split detector represents a positive or negative value, which can be used to center the beam right on the track. That is, a tracking servo control device is operated to position an optical read/write head (which generates a tracking beam as well as read/write beam) relative to the optical data storage medium, so that the differential output of the split photodetector is zeroed in a feedback manner.

In the presence of the tracking grooves formed in one of opposite major surfaces of the substrate 61, the data storage layer 62 and protective layer 63 formed on that one major surface are locally recessed corresponding to the pattern of the groove structure.

The push-pull or continuous far-field tracking method utilizing the diffraction beam pattern as described above tends to be easily influenced by disturbances such as vibrations, since the intensity of the diffraction beams is relatively small. Further, the shoulder or stepped portions between the recording tracks and the tracking grooves are likely to have different thicknesses. Since the anisotropic properties at the local recording spots are affected by the thickness of the recording tracks, the varying thickness at the edge portions of the recording tracks may lead to instability of the anisotropic information written on each track, causing a relatively low S/N ratio. Further, structural deterioration of the storage layer may arise from the shoulder portions.

SUMMARY OF THE INVENTION

It is therefore a first object of the present invention to provide an optical data storage medium which permits accurate and reliable tracking, and assure improved information recording stability and enhanced structural durability.

A second object of the invention is to provide a process of fabricating such an optical data storage medium.

A third object of the invention is to provide a tracking system suitable for positioning an optical head relative to such an optical storage medium.

The first object may be achieved according to the principle of one aspect of the present invention, which provides an optical data storage medium having at least one elongate recording track, comprising: (a) means for defining each recording track; and (b) tracking guide means, disposed so as to at least partially define each recording track, for providing tracking servo information to be optically read for alignment of a read/write beam with each recording track. The tracking guide means is formed of a material which has a higher coefficient of light absorption than that of a material of the means for defining each recording track.

The tracking guide means may consists of a plurality of concentric rings which have different diameters and which define a plurality of concentric recording tracks. Alternatively, the tracking guide means may consist of a plurality of parallel straight or curved strips which define a plurality of parallel straight or curved recording tracks. Further alternatively, the tracking guide means may consist of a single continuous spiral strip which defines a single continuous recording track.

When the tracking operation is effected on the present optical data storage medium by a three-beam method using a center beam and two side beams, an amount of deviation of a recording track from the optical axis of an optical read/write head can be represented by a relatively large variation in the difference between the amounts of the reflected side beams, since the tracking guide means partially irradiated by the side beams has a relatively high light absorption coefficient (higher than that of the recording track), so that the amount of the side beams reflected by the tracking guide means is smaller than that reflected by the recording track. This arrangement assures highly sensitive and accurate tracking operation, and thereby permitting precise alignment or centering of the read/write beam with respect to the desired recording track.

The tracking guide means in the form of a continuous spiral strip, concentric rings or parallel straight or curved strips, for example, is preferably disposed so as to define a width of each recording track. The light absorption coefficient of the tracking guide means may be sufficiently high, when it is formed of a black-colored material containing carbon.

One preferred form of the optical data storage medium according to the present invention comprises a transparent substrate which is formed of a light transparent material, a flattening layer formed on the substrate, and a data storage layer formed on the flattening layer. The tracking guide means is formed on one of opposite major surfaces of the transparent substrate such that the tracking guide means covers a part of that one major surface. The flattening layer is formed on the same major surface of the transparent substrate, so as to cover the tracking guide means and the part of that major surface of the substrate. The flattening layer has a flat surface remote from the substrate. The data storage layer, which has the at least one recording track, is formed on the flat surface of the flattening layer. In recording/reading operations, the storage medium is positioned such that the substrate faces an optical head.

In the above form of the present invention, the flattening layer permits the data storage layer to have a substantially constant thickness over the entire surface area, thereby assuring consistent recording of information on the recording track or tracks, namely, consistent anisotropic properties at the local recording spots. Further, the flattening layer permits the data storage layer to be formed flat, without raised and recessed portions, whereby the structural durability of the medium is improved, and the anisotropic properties given to the recording tracks are not influenced or disturbed by the shoulder portions as provided on the conventional data storage medium. Therefore, the present optical data storage medium has prolonged life expectancy, and assure enhanced S/N ratio, with reduced noises due to the presence of the tracking guide means embedded in the storage medium to provide the tracking servo information.

The data storage layer may preferably consist essentially of Te, TeOx or TbFeCo. The flattening layer may include a first layer formed by spin coating, and a second layer formed by one of vacuum vapor deposition and sputtering.

In the same form of the invention, the optical data storage medium may further comprise a protective layer formed on the data storage layer. This protective layer may consist consist essentially of $SiO_2$.

Another preferred form of the optical data storage medium comprises: a transparent substrate which is formed of a light transparent material; a first protective layer formed on one of opposite major surfaces of the transparent substrate; a data storage layer formed on the first protective layer; and a second protective layer formed on the d data storage layer. In this case, the tracking guide means is formed on one of opposite surfaces of the second protective layer which is remote from the data storage layer. In this case, the storage medium is positioned such that the substrate is positioned remote from the optical head of a recording/reading apparatus.

The second object indicated above may be achieved according to a second aspect of the present invention, which provides a process of fabricating an optical data storage medium having at least one elongate recording track, comprising the steps of: (i) forming, on one of opposite major surfaces of a transparent substrate, tracking guide means for at least partially defining each recording track and providing tracking servo information to be optically read for alignment of a read/write beam with each recording track, the tracking guide means being formed of a first material which has a higher coefficient of light absorption than that of a second material of the at least one elongate recording track, the tracking guide means being formed so as to cover a part of that one major surface of the transparent substrate; (ii) forming a flattening layer so as to cover the tracking guide means and the above-indicated part of the above-indicated one major surface of the transparent substrate, the flattening layer having a flat surface remote from that one major surface; and (iii) forming a data storage layer on the flat surface of the flattening layer, the data storage layer having the at least one elongate recording track.

The tracking guide means may be formed by: applying a photoresist coating to the above-indicated one major surface of the transparent substrate, removing a part of the photoresist coating which corresponds to the above-indicated part of the above-indicated one major surface of the transparent substrate; applying the first material so as to cover the above-indicated part of the major surface of the transparent substrate and another part of the photoresist coating which remains on the major surface of the substrate; and removing the remaining part of the photoresist coating, together with a portion of the first material which covers the remaining part of the photoresist coating, thereby forming the tracking guide means locally on the above-indicated one major surface of the transparent substrate.

The flattening layer may be formed by: rotating the transparent substrate with the tracking guide means formed on the above-indicated one major surface thereof, with that one major surface facing up; applying a liquid metal alkoxide to the above-indicated one major surface of the transparent substrate while the substrate is rotating; and heating the liquid metal alkoxide applied to the above-indicated one major surface, thereby forming the flattening layer consisting of $SiO_2$.

The third object indicated above may be attained according to a third aspect of the present invention, which provides a tracking system for positioning an optical head relative to an optical data storage medium, for alignment of a read/write beam with one of at least one elongate recording track provided on the storage medium, when information is read from or written on the recording track, the tracking device comprising: (a) tracking guide means, disposed on the data storage medium so as to at least partially define each elongate recording track, for providing tracking servo information to be optically read for the alignment of the read/write beam, the tracking guide means being formed of a material which has a higher coefficient of light absorption than that of a material of the recording track; (b) illuminating means incorporated in the optical head, for generating at least one tracking beam and directing the at least one tracking beam toward the data storage medium such that at least one of the at least one tracking beam irradiates a spot including an edge portion of the tracking guide means adjacent to one side edge thereof; and (c) tracking control means for positioning the optical head relative to the data storage medium, based on a variation in an amount of the tracking beam or beams received from the data storage medium.

According to one form of the tracking system of the present invention, the tracking guide means has a pair of inner side edges which define a width of each elongate recording track, and a pair of outer side edges which partially define another track next to the recording track defined by the inner side edges. In this case, the illuminating means generates a center beam for irradiating one recording track, and a pair of side beams for irradiating respective spots including respective edge portions of the tracking guide means adjacent to the pair of outer edges.

According to another form of the tracking system, the illuminating means includes a laser source for generating a single laser beam, a diffraction grating element for splitting the laser beam into the center beam and the pair of side beams, and an objective lens for focusing the center and side beams such that the center beam irradiates one recording track while the side beams irradiate the respective edge portions of the tracking guide means.

According to a further form of the tracking system, the tracking control means positions the optical head relative to the data storage medium, based on a variation in a difference between amounts of the pair of side beams which are reflected from the data storage medium.

The tracking system may further comprise focusing means including a converging lens and a cylindrical lens which receive the center beam reflected from the data storage medium, a quadrant photodetector which receives the center beam transmitted through the converging and cylindrical lenses, and focusing control means for positioning the optical head relative to the data storage medium in a direction of an optical axis of the optical head, based on an output of the quadrant photodetector.

BRIEF DESCRIPTION OF THE DRAWINGS

The above and other objects, features and advantages of the present invention will become more apparent by reading the following detailed description of presently preferred embodiments of the present invention, when considered in connection with the accompanying drawings, in which.

DETAILED DESCRIPTION OF THE PREFERRED EMBODIMENTS

Figure 1:
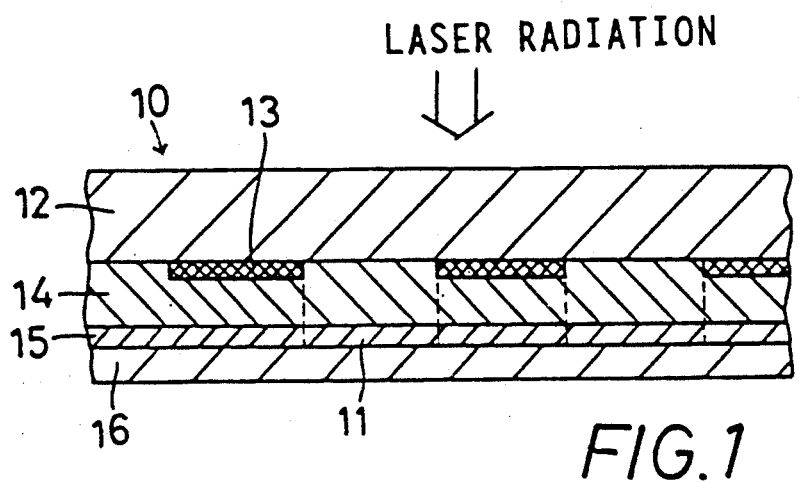
FIG. 1 is a fragmentary elevational view in cross section of one embodiment of an optical storage medium of the present invention.

Referring first to the fragmentary cross sectional view of FIG. 1, reference numeral 10 denotes an optical data storage medium in the form of an optical storage disk, which consists of a disk substrate 12 (uppermost layer as seen in the figure), and a flattening layer 14, a data storage layer 15 and a protective layer 16 which are formed in the order of description on one of the opposite major surfaces of the substrate 12. On this major surface of the substrate 12, there is formed tracking guide means in the form of a plurality of concentric rings 13, which are embedded between the substrate and the flattening layer 14. These concentric tracking rings 13 have different diameters and are radially equally spaced from each other, so as to define a plurality of concentric recording tracks 11 on the data storage layer 15. More precisely, each recording track 11 in the form of a ring is defined by the adjacent two tracking rings 13.

The tracking rings 13 are formed of a material which has a higher coefficient of light absorption than a material of the substrate 10. For example, the tracking rings 13 are formed of a black-colored material whose major component consists of carbon (C). The substrate 10 is formed of a transparent material such as a glass. As described below, the tracking rings 13 as the tracking guide means provide tracking servo information which is optically read for aligning a read/write beam of an optical read/write head with a desired one of the recording tracks 11.

The tracking rings 13 are formed on the disk substrate 12 in a process as illustrated in FIGS. 2A through 2F, by way of example only. In these figures, the substrate and tracking rings are indicated at 20 and 23a, respectively.

Figure 2A:
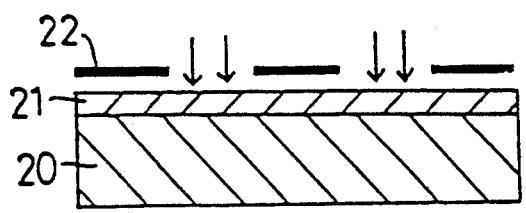
FIGS. 2A through 2F are views illustrating an example of a process of manufacture of the optical storage medium of FIG. 1.

Initially, a photoresist coating 21 is applied to cover an entire area of one of the opposite flat major surfaces of a transparent glass substrate 20, as shown in FIG. 2A. This photoresist coating 21 is formed by a spin coating method, by using a suitable photoresist material. Then, the photoresist coating 21 is exposed to a radiation through a photomask 22 which has concentric annular cutouts corresponding to the concentric recording tracks 11 to be obtained. However, the photoresist coating 21 may be exposed directly by a laser beam, without the photomask 22, so as to obtain a pattern of concentric annular exposed areas corresponding to the pattern of the cutouts of the photomask 22. The exposed annular areas of the photoresist coating 21 corresponding to the annular cutouts of the photomask 22 are cured.

Figure 2B:
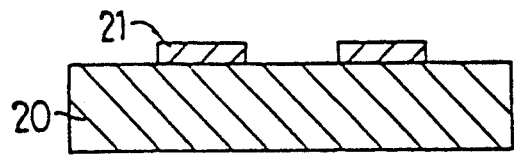
Figure 2C:
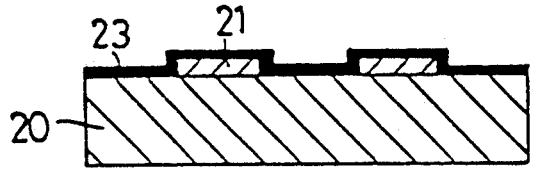
Figure 2D:

By developing the exposed photoresist coating 21, the exposed and cured annular areas of the coating 21 remain on the substrate 20 as shown in FIG. 2B. Subsequently, a thin film 23 is formed, as shown in FIG. 2C, by sputtering or vacuum vapor deposition, so as to cover the surface of the substrate 20 on which the photoresist 21 is formed. The thin film 23 consists of carbon (C) or other material which has a higher coefficient of light absorption than that of the glass material of the substrate 20. The photoresist 21 remaining on the substrate 20 is then removed, together with the portions of the thin film 23 covering the photoresist 21, by using a suitable organic solvent such as acetone. As a result, the other portions of the thin film 23 are left as concentric tracking rings 23a, on the glass substrate 20, as indicated in FIG. 2D.

Alternatively, the tracking rings 23a may be formed by first applying the thin film 23 to the relevant surface of the substrate 20, then forming the photoresist coating 21 on the thin film 23, and finally processing the coating and film 21, 23 by a well known photolithographic technique, so as to obtain the tracking rings 23a.

Figure 2E:
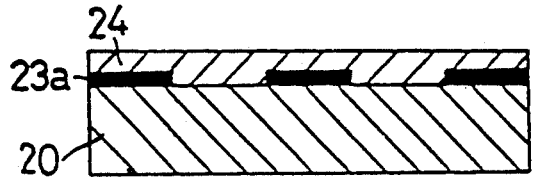

In the next step, the surface of the substrate 20 on which the tracking rings 23a are formed is covered by a flattening layer 24, which is formed of a chemically stable, transparent oxide such as $SiO_2$. Thus, the tracking rings 23a which function to provide tracking servo information are embedded between the flattening layer 24 and the substrate 20, as shown in FIG. 2E. For instance, the flattening layer 24 may be formed by applying a liquid metal alkoxide such as alkoxide of Si to the substrate 20 and baking the applied alkoxide at an elevated temperature around 400° C. so as to obtain an oxide such as $SiO_2$, while the substrate 20 is rotated with the tracking rings 23a facing up. The flattening layer 24 covers the tracking rings 23a, and the areas of the surface of the substrate 20 which are not covered by the tracking rings 23a. The flattening layer 24 has a flat surface remote from the substrate 20, as indicated in FIG. 2E.

Figure 2F:
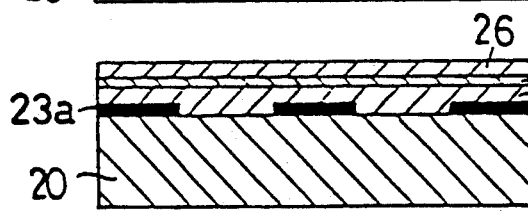

On the flat surface of the flattening layer 24, there are formed a data storage layer 25 and a protective layer 26, by a suitable method such as sputtering or vacuum vapor deposition, as shown in FIG. 2F. The data storage layer 25 may be formed of Te or TeOx. In this case, the obtained optical disk is used as a read-only optical storage medium, or an optical storage medium in which the local areas of the layer 25 are changeable between two phases (e.g., crystalline and non-crystalline states). Alternately, the data storage layer 25 may be formed of a magneto-optical material such as TbFeCo. In this case, the obtained optical disk is used as a magneto-optical storage medium.

The protective layer 26 is provided to protect the data storage layer 25 from a chemical change, and to improve the recording sensitivity by amplifying the Kerr effect of the magneto-optical material of the storage layer 25, or by adjusting the light reflectance of the storage layer 25. Like the flattening layer 24, the protective layer 26 is formed of a chemically stable, transparent oxide such as $SiO_2$, by sputtering, vacuum vapor deposition, CVT (chemical vapor deposition), spin coating, or other suitable method.

Figure 3:
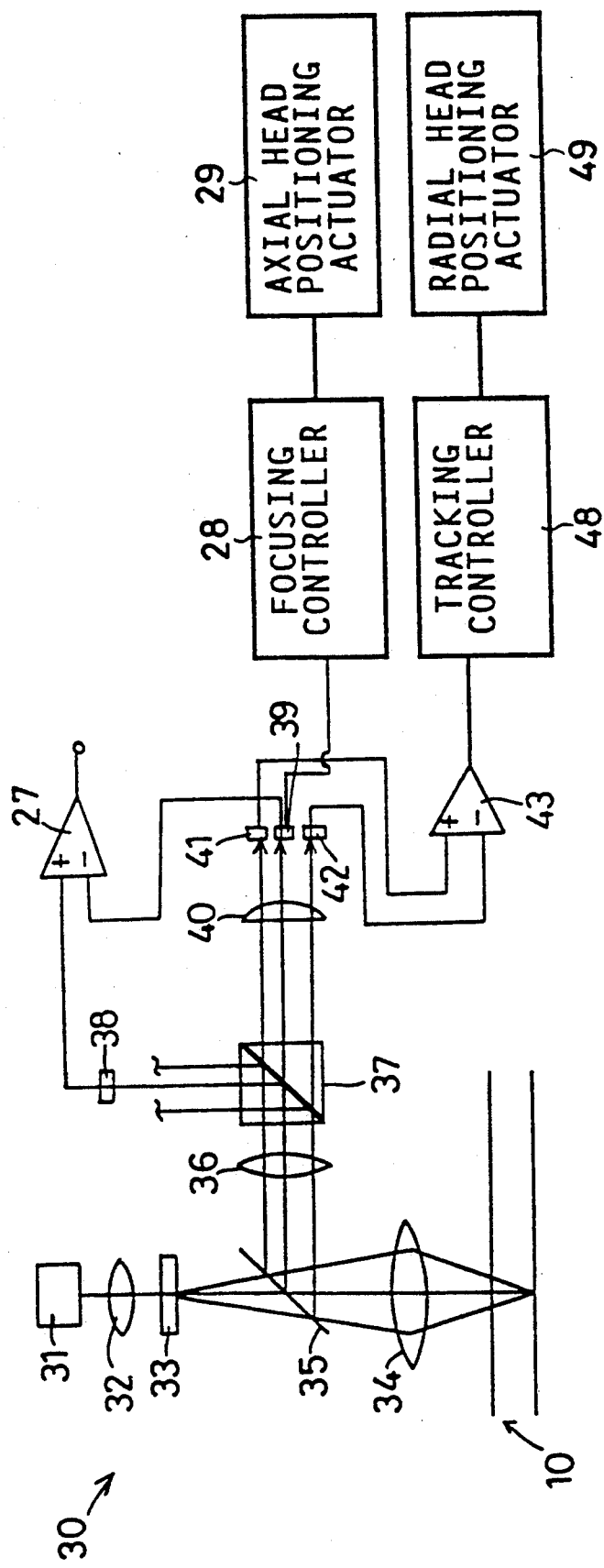
FIG. 3 is a schematic view showing an example of an optical recording and reading head for recording and reading information on and from an optical storage medium constructed according to the invention.

Referring to FIG. 3, there is shown an information recording/reading apparatus which incorporates an optical head 30, and a focusing/tracking system. While the optical head 30 is adapted to effect recording and reading operations on the data storage medium in the form of the magneto-optical disk 10, the storage medium may be any other type of optical storage medium such as a medium wherein the phase of the local areas of the storage layer are changeable between two states.

The recording/reading apparatus uses a semiconductor laser 31 which generates a laser radiation. The radiation is converted into parallel rays by a collimator lens 32. The parallel rays are incident upon a diffraction grating element 33, which are divided into three beams, namely, a center beam 45 and a pair of side beams 46, 47. These beams 45-47 are converged on the storage layer of center and side beams 45-47 are reflected by the optical disk 10, and the reflected beams are reflected by a half mirror 35 and are incident upon a polarizing beam splitter 37 through a lens 36. Each of the three beams 45-47 is split by the splitter 37 into two components which have mutually perpendicular planes of polarization. A first and a second photodetector 38, 39 are provided to receive the two components of the main beam 45 whose polarization planes are rotated depending upon the direction of magnetization of the local spots of the magneto-optical storage layer of the disk 10. The outputs of these photodetectors 38, 39 are received by a differential amplifier 27, whose output represents the direction of magnetization of each reading spot, whereby the information written at each reading spot is read.

The second photodetector 39 is a quadrant photodiode which receives one of the two components of the main beam 45, through a cylindrical lens 40 disposed between the beam splitter 37 and the photodiode 39. The quadrant photodiode 39 produces an astigmatic differential signal representative of a focusing error of the read beam with respect to the storage layer of the optical disk 10. More specifically, if the center beam 45 is out of focus on the storage layer, the image on the quadrant photodiode 39 will be elliptical, with the major axis orientation dependent on the out-of-focus direction. The astigmatic focusing error signal from the quadrant photodiode 39 is applied to a focusing controller 28 whose output is fed to an axial head positioning actuator 29 which is adapted to position the optical head 30 relative to the optical disk 10 in axial direction of the disk, according to the received output of the controller 28. Thus, the read beam (center beam 45) incident upon the optical disk 10 is focused on the surface of the storage layer (indicated at 15 in FIG. 1, for example).

Figure 4:
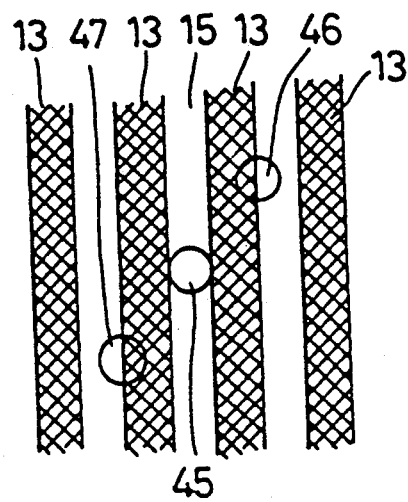
FIG. 4 is a view indicating tracking beam spots on the optical storage medium.

As indicated in FIG. 4, the optical head 30 is generally positioned such that the spot of the center beam 45 on the optical disk 10 is positioned approximately on a specific recording track on the storage layer 15, while the spots of the two side beams 46, 47 only partially overlap the outer edge portions of the adjacent two tracking rings 13, 13 which are remote from the recording track 11 (FIG. 1) on which the center beam 45 is positioned. In other words, the three beams 45-47 are initially roughly positioned such that the center beam 45 irradiates the entire width (radial distance) of the relevant recording track 11 defined by the appropriate two adjacent tracking rings 13, while the side beams 46, 47 irradiates respective spots each of which consists of an area of the recording track next to the relevant recording track, and an edge portion of the tracking ring 13 adjacent to the relevant recording track, such that the spot of each side beam 456, 47 only partially overlaps the edge portion of the corresponding tracking ring 13 which is remote from the edge (inner side edge) on the side of the relevant recording track on which the center beam 45 is located.

The relative positions between the center beam 45 and the side beams 46, 47 in the radial direction of the disk 10 are determined such that the main beam 45 is centered on or aligned with the centerline of the recording track 11, when the edge portions of the two adjacent tracking rings 45 are irradiated by the half of the spots of the side beams 46, 47. If the main beam 45 is located right in the middle of the two tracking rings 13 or correctly centered on the relevant recording track 11 therebetween, the intensity of the reflected side beam 46 is equal to that of the reflected side beam 47.

The components of the reflected side beams 46, 47 are received by respective third and fourth photodetectors 41, 42, also through the polarizing beam splitter 35, lens 36, and cylindrical lens 40. The outputs of the photodetectors 41, 42 are received by respective inputs of a differential amplifier 43. If the center beam 45 is centered on the relevant recording track 45, the difference between the outputs of the two photodetectors 41, 42 is zero, and the differential signal produced by the differential amplifier 43 is also zero.

If the center beam 45 is deviated from the nominal position (from the centerline of the relevant recording track 11) to the right in FIG. 4, the spot of the side beam 47 is moved to the right, whereby the area of the edge portion of the tracking ring 13 irradiated by the side beam 47 is increased. Since the tracking rings 13 are formed of a material whose light absorption coefficient is high, the amount of the rightwardly moved side beam 47 reflected by the disk 10 is reduced. Conversely, the amount of the similarly rightwardly moved side beam 46 reflected by the disk 10 is increased. Consequently, the differential signal output of the differential amplifier 43 becomes positive, indicating that the center beam 45 is deviated in the right direction (as seen in FIG. 4) relative to the relevant recording track 11 (disk 10). On the other hand, when the center beam 45 is deviated to the left, the spot of the side beam 46 is moved to the left, whereby the area of the edge portion of the tracking ring 13 irradiated by the side beam 46 is increased, and the amount of the leftwardly moved side beam 46 reflected by the disk 10 is reduced, while the amount of the similarly leftwardly moved side beam 47 reflected by the disk 10 is increased. Accordingly, the differential signal output of the differential amplifier 43 becomes negative, indicating that the center beam 45 is deviated in the left direction.

The differential signal of the differential amplifier, i.e., tracking error signal, is applied to a tracking controller 48 whose output is fed to a radial head positioning actuator 49, which is adapted to position the optical head 30 relative to the optical disk 10, in the radial direction of the disk 10, according to the tracking error signal. The radial head positioning actuator 49 is controlled so that the tracking error signal from the differential amplifier 43 is zeroed. In this manner, the center beam 45 is centered right on the centerline of the relevant recording track 11, which is perpendicular to the radial spacing between the appropriate two adjacent tracking rings 13.

Since the tracking guide means in the form of the concentric tracking rings 13 is formed of a material having a higher light absorption coefficient than that of the substrate 12, the amount of variation in the amount of the side beams 46, 47 reflected by the disk 10 per a given amount of deviation of the center beam 45 is larger than the amount of variation in the amount of the reflected light due to interference of the first-order and zeroth-order beams diffracted by tracking grooves conventionally provided in an optical disk for the tracking purpose. Thus, the present optical disk 10 assures enhanced tracking accuracy and reliability.

When information is recorded on or erased from the storage layer 15 of the optical disk 10, the intensity of the center beam 45 is increased so as to heat the magneto-optical material of the layer 15 to a point near the Curie point. In this condition, the local areas of the storage layer 15 are magnetized in the appropriate directions according to the information to be written, or in the same direction for erasing the already recorded information.

Figure 6:
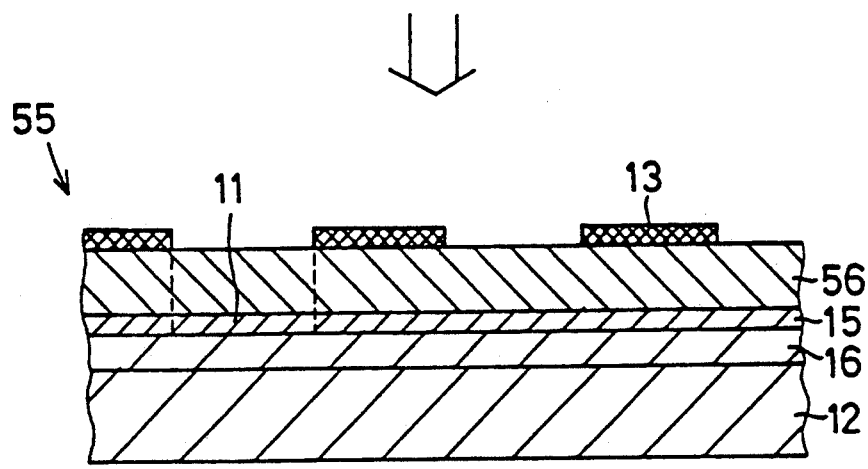
FIG. 6 is a fragmentary elevational view in cross section of a further modified embodiment of the invention.

In the optical disk 10 constructed according to the present embodiment, the data storage layer 15 is formed flat and has a constant thickness, owing to the flat surface of the flattening layer 14, even though the concentric tracking rings 13 are locally formed on the surface of the disk substrate 12. Therefore, the storage layer 15 does not have shoulder or stepped portions as in a conventional disk which has tracking grooves, as shown in FIG. 6, which stepped portions tend to cause oxidation of the storage layer. Thus, the present optical disk 10 has improved life expectancy, without deterioration originated from the stepped portions due to the presence of tracking grooves. Further, the tracking rings 13 will not disturb anisotropic properties of the storage layer 15, i.e., will not influence a signal waveform representative of the information written on the storage layer 15, and the information can be reproduced with minimum noises, namely, with an improved S/N ratio.

More specifically, the anisotropy of magnetization of the local spots on the storage layer 15 in the opposite directions perpendicular to the plane of the layer 15 may be influenced by the layer 15 had stepped or shoulder portions due to the presence of the tracking rings 13. In the present optical disk 10, however, the storage layer 15 is formed flat without such shoulder portions, and the intended anisotropic magnetic properties (magnetizing directions) can be given to the storage layer 15, and the information defined by the anisotropic properties can be read with a high S/N ratio.

Figure 5:
FIG. 5 is a fragmentary elevational view in cross section of a modified embodiment of the optical storage medium of the invention.
Figure 5:
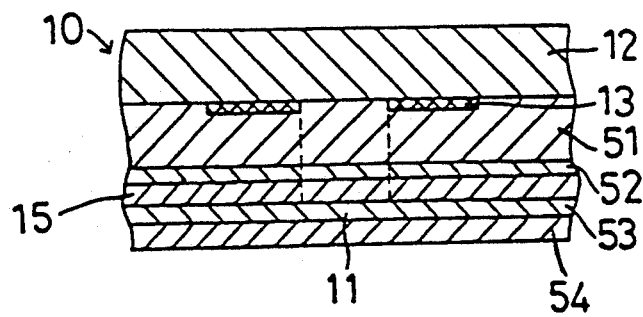
Figure 7:
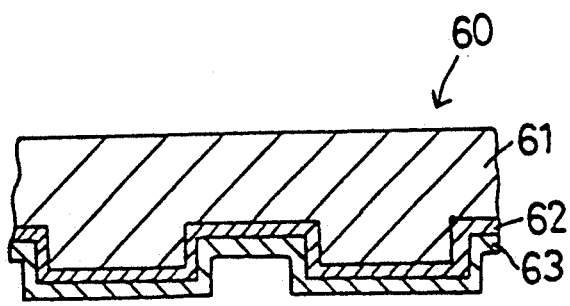
FIG. 7 is a fragmentary elevational view in cross section showing an example of a conventional optical storage medium.

While the optical disk 10 is illustrated in FIG. 1 as one example of the optical data storage medium according to the present invention, the optical disk 10 may be modified as needed. For instance, each of the flattening layer 15 and protective layer 16 may consist of a plurality of layers. In the example of FIG. 5, the flattening layer consists of a first layer 51 formed on the substrate 12 by spin coating, and a second layer 52 formed on the first layer 51 by sputtering or vacuum vapor deposition, while the protective layer consists of a first layer 53 formed on the storage layer 15 by sputtering or vacuum vapor deposition, and a second layer formed on the first layer 53 by spin coating. In this modified embodiment, the second flattening layer 52, storage layer 15, and first protective layer 53 are may be continuously formed in vacuum, whereby the the optical disk 10 can be fabricated with high efficiency, while the storage layer 15 is protected from oxidation or other chemical changes.

Although the substrate 12 is formed of a glass material, it may be formed of an acrylic, polycarbonate, polyolefin, epoxy or other synthetic resin.

The tracking rings 13 may be formed of a material other than carbon, such as $Fe_2O_3$, $Ta_2O_3$ or other oxides.

The flattening and protective layers 14, 16 may be formed of any suitable materials other than those indicated above. The protective layer 16 is not essential, and may be eliminated.

While FIGS. 2A through 2F illustrate one example of a process for fabricating the optical disk 10, the process may be modified as needed, provided that the tracking guide means (tracking rings 13) is formed of a material whose light absorption coefficient is higher than that of the substrate 10, and the flattening layer 14 has a flat surface on which the storage layer 15 is formed.

The optical disks 10 shown in FIGS. 1 and 5 are adapted such that a laser radiation is incident upon the major surface of the substrate 12 which is remote from the tracking rings 13, namely, such that the substrate 12 faces an optical head generating the laser radiation, as indicated by arrow. However, the present invention is applicable to an optical data storage medium which is positioned relative to an optical head such that the substrate 12 is remote from the optical head, as shown in FIG. 6. In this case, the optical head is constructed as indicated at 55 in FIG. 6.

In the optical disk 55 of FIG. 6, the protective layer 16 is formed on one of opposite major surfaces of the substrate 12, and the data storage layer 15 is formed on the protective layer 16 so that the storage layer 15 is protected by the protective layer 16 from chemical changes. On the storage layer 15, there is formed another protective layer 56. Like the protective layer 16 provided on the disk 10 of FIG. 1, the protective layer 56 serve to protect the storage layer 15 from chemical changes, and amplify the Kerr effect of the magneto-optical material of the storage layer 15. On the protective layer 56, the tracking rings 13 are provided so as to define the width of the concentric recording tracks 11.

In the optical disk constructed according to the present invention, the tracking rings 13 may be used as additional recording tracks, by irradiating selected data bit areas on the rings 13, with a laser beam, so that pits are formed in the selected data bit areas. Since the data bit areas having the pits have increased light reflectance, the information recorded by forming the pits on the rings 13 can be read based on the amount of the light reflected by the data bit areas of the rings 13.

While the optical data storage media according to the illustrated embodiments take the form of a disk, the optical data storage medium according to the invention is not limited to an optical disk. For example, the medium may be a rectangular plate. In this case, the tracking guide means may be a plurality of parallel straight strips formed parallel to one side of the plate, or may be parallel curved strips, provided that the parallel strips define a plurality of parallel straight or curved recording tracks.

It is to be understood that the present invention may be embodied with various other changes, modifications and improvements, which may occur to those skilled in the art, without departing from the spirit and scope of the invention defined in the following claims.

What is claimed is:

1. An optical data storage medium having at least one elongate recording track, comprising:
   means for defining each of said at least one recording track; and
   tracking guide means, disposed so as to at least partially define said each recording track, for providing tracking servo information to be optically read for alignment of a read/write beam with said each recording track, said tracking guide means being formed of a material which has a higher coefficient of light absorption than that of a material of said means for defining each of said at least one elongate recording track.

2. An optical data storage medium according to claim 1, wherein said tracking guide means is disposed so as to define a width of said each recording track.

3. An optical data storage medium according to claim 1, wherein said tracking guide means is formed of a black-colored material containing carbon.

4. An optical data storage medium according to claim 1, further comprising:
   a transparent substrate which is formed of a light transparent material, said tracking guide means being formed on one of opposite major surfaces of said transparent substrate such that said tracking guide means covers a part of said one major surface;
   a flattening layer formed on said one major surface of said transparent substrate, so as to cover said tracking guide means and said part of said one major surface, and having a flat surface remote from said one major surface; and
   a data storage layer formed on said flat surface of said flattening layer and having said at least one recording track.

5. An optical data storage medium according to claim 4, wherein said data storage layer consists essentially of Te, TeOx or TbFeCo.

6. An optical data storage medium according to claim 4, wherein said flattening layer comprises a first layer formed by spin coating, and a second layer formed by one of vacuum vapor deposition and sputtering.

7. an optical data storage medium according to claim 4, further comprising a protective layer formed on said data storage layer.

8. An optical data storage medium according to claim 7, wherein said protective layer consists essentially of $SiO_2$.

9. An optical data storage medium according to claim 7, wherein said flattening layer comprises a first layer formed by spin coating, and a second layer formed by one of vacuum vapor deposition and sputtering, and said protective layer comprises a first layer formed by one of vacuum vapor deposition and sputtering, and a second layer formed by spin coating.

10. An optical data storage medium according to claim 1, further comprising:
    a transparent substrate which is formed of a light transparent material;
    a first protective layer formed on one of opposite major surfaces of said transparent substrate;
    a data storage layer formed on said first protective layer; and
    a second protective layer formed on said data storage layer, said tracking guide means being formed on one of opposite surfaces of said second protective layer which is remote from said data storage layer.

11. An optical data storage medium according to claim 1, wherein said tracking guide means consists of a plurality of concentric rings which have different diameters and which define a plurality of concentric recording tracks.

12. An optical data storage medium according to claim 1, wherein said tracking guide means consists of a single continuous spiral strip defining a single continuous spiral recording track.

* * * * *